(No Model.) 5 Sheets—Sheet 1.

G. W. COPELAND & M. BROCK.
BOOT AND SHOE LASTING MACHINE.

No. 254,617. Patented Mar. 7, 1882.

(No Model.)

G. W. COPELAND & M. BROCK.
BOOT AND SHOE LASTING MACHINE.

No. 254,617. Patented Mar. 7, 1882.

WITNESSES
H. C. Fogg
Fred Harris

INVENTOR
Geo. W. Copeland
Matthias Brock
by their attys
Clarke & Raymond

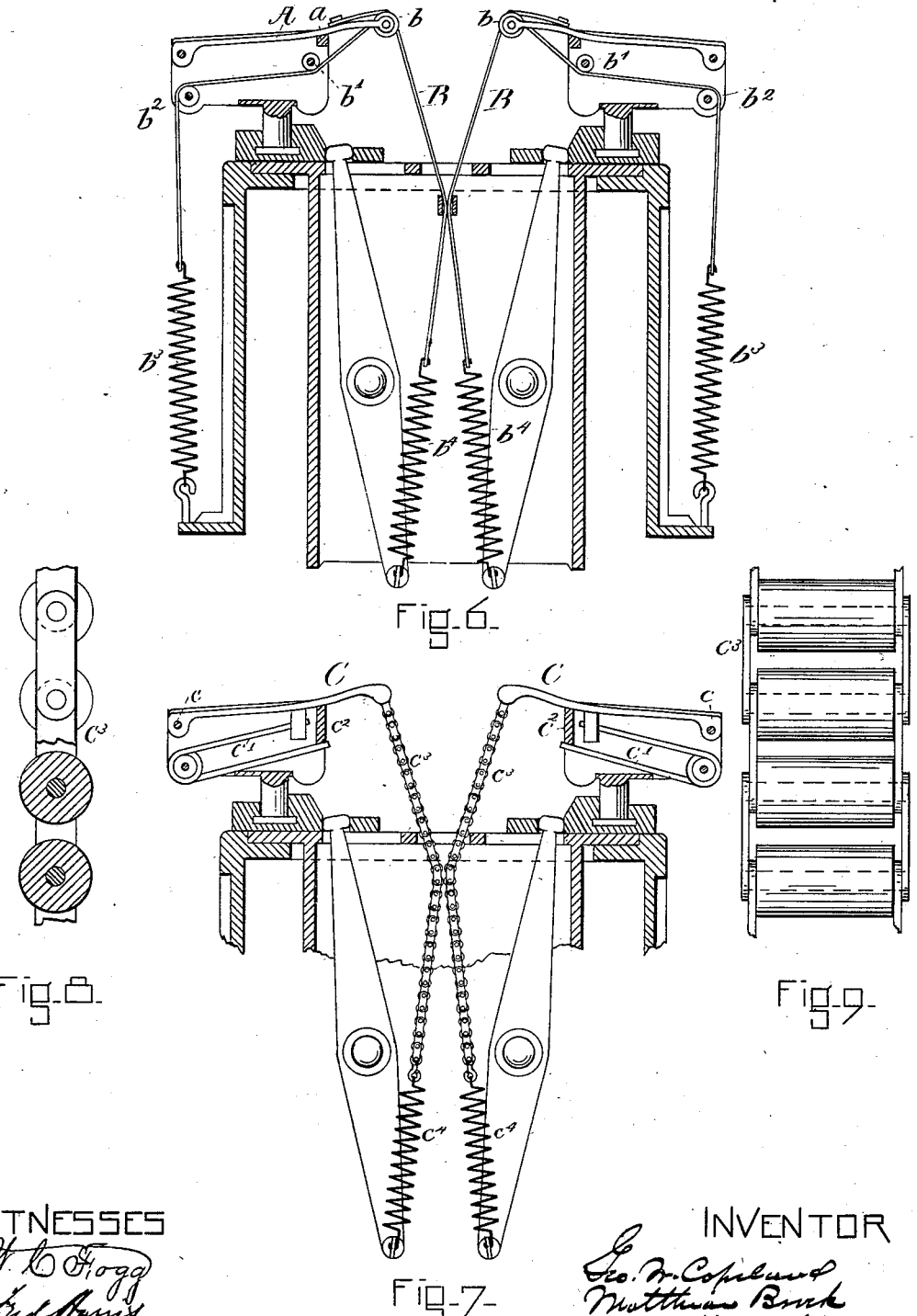

(No Model.) 5 Sheets—Sheet 4.

G. W. COPELAND & M. BROCK.
BOOT AND SHOE LASTING MACHINE.

No. 254,617. Patented Mar. 7, 1882.

(No Model.)

G. W. COPELAND & M. BROCK.
BOOT AND SHOE LASTING MACHINE.

No. 254,617. Patented Mar. 7, 1882.

UNITED STATES PATENT OFFICE.

GEORGE W. COPELAND, OF MALDEN, AND MATTHIAS BROCK, OF BOSTON, MASSACHUSETTS, ASSIGNORS TO THE COPELAND LASTING MACHINE COMPANY, OF HARTFORD, CONNECTICUT.

BOOT AND SHOE LASTING MACHINE.

SPECIFICATION forming part of Letters Patent No. 254,617, dated March 7, 1882.

Application filed January 28, 1882. (No model.)

*To all whom it may concern:*

Be it known that we, GEORGE W. COPELAND, of Malden, in the county of Middlesex, in the State of Massachusetts, and MATTHIAS BROCK, of Boston, in the county of Suffolk, in said State, citizens of the United States, have invented a new and useful Improvement in Boot and Shoe Lasting Machines, of which the following is a full, clear, and exact description, reference being had to the accompanying drawings, forming a part of this specification, in explaining its nature, in which—

Figure 1:
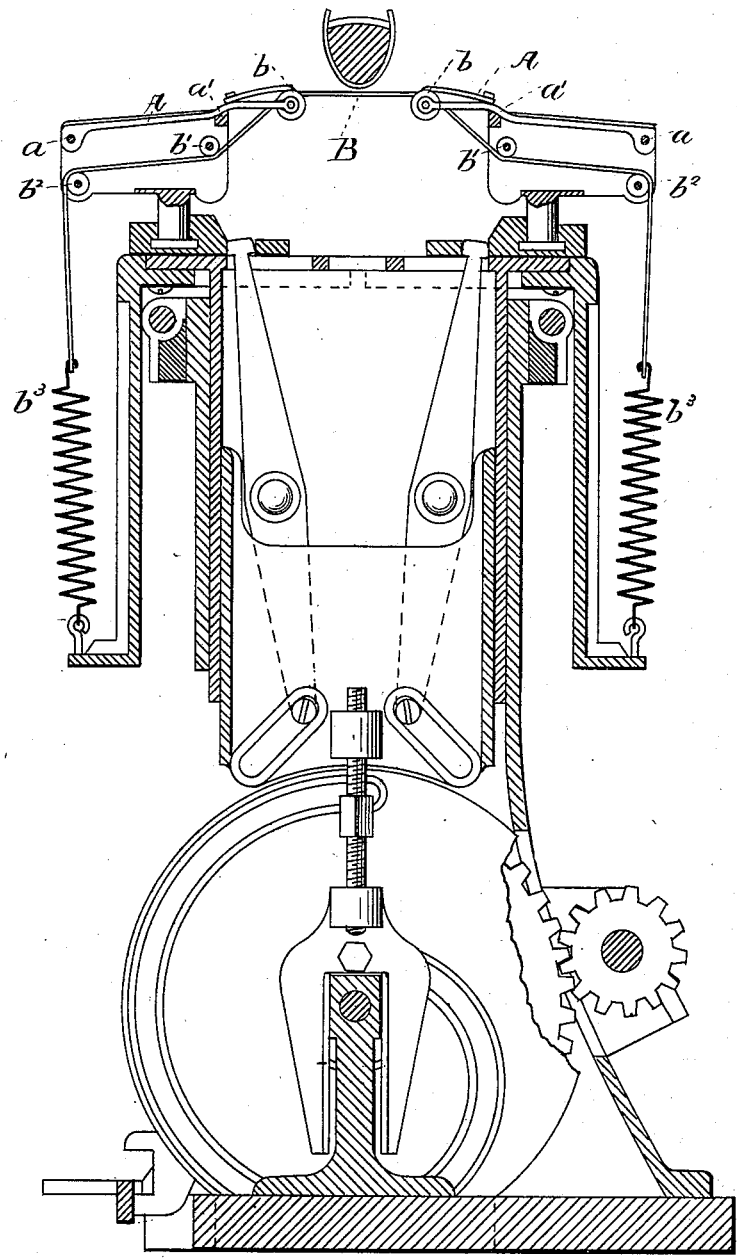
Figure 2:
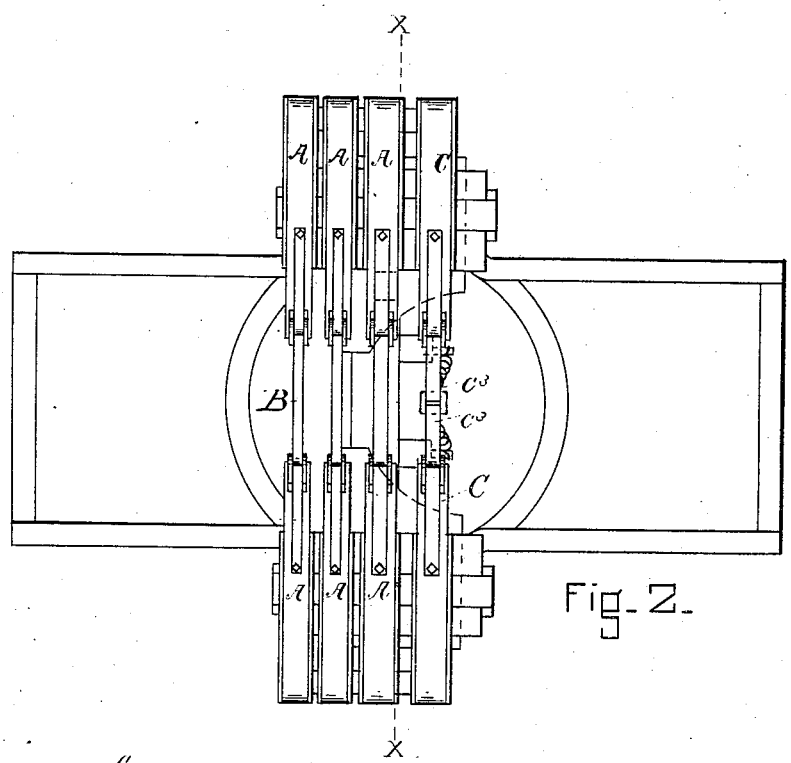
Figure 3:
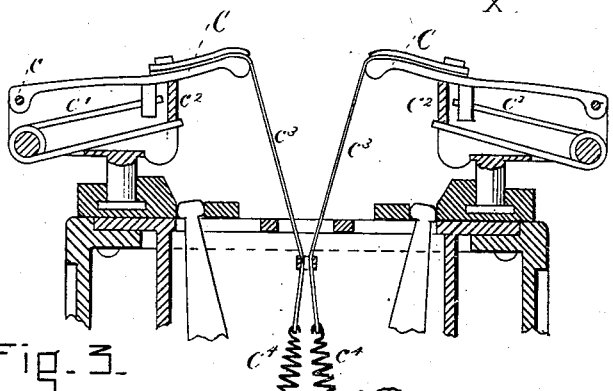
Figure 4:
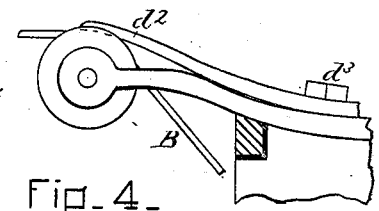
Figure 5:
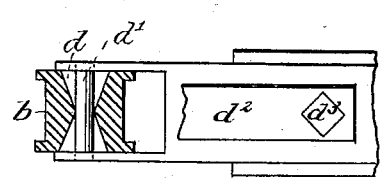
Figure 14:
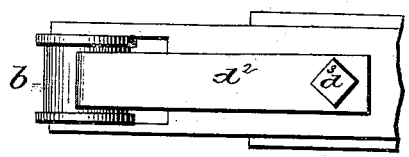
Figure 10:
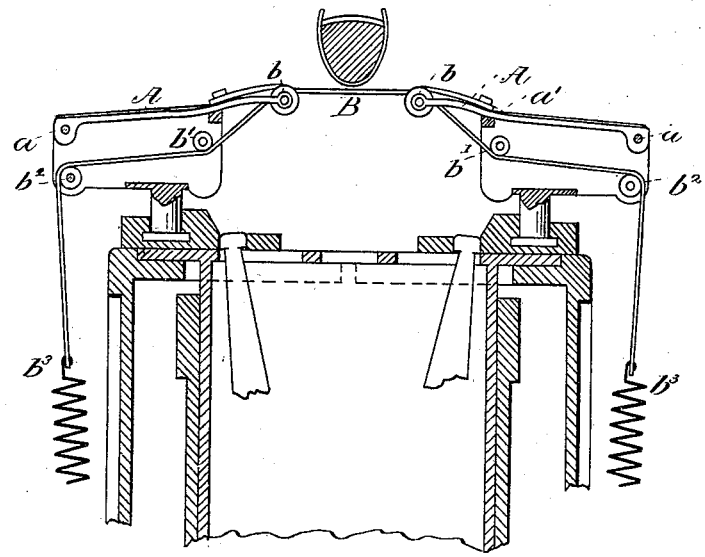
Figure 11:
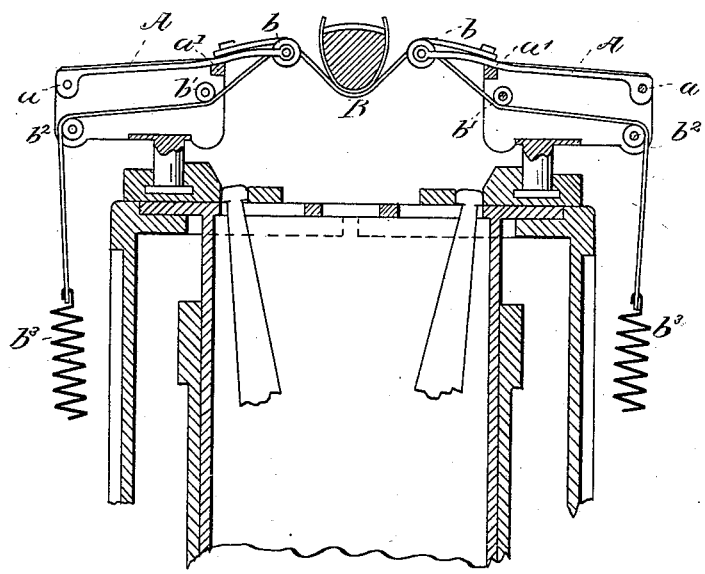
Figure 12:
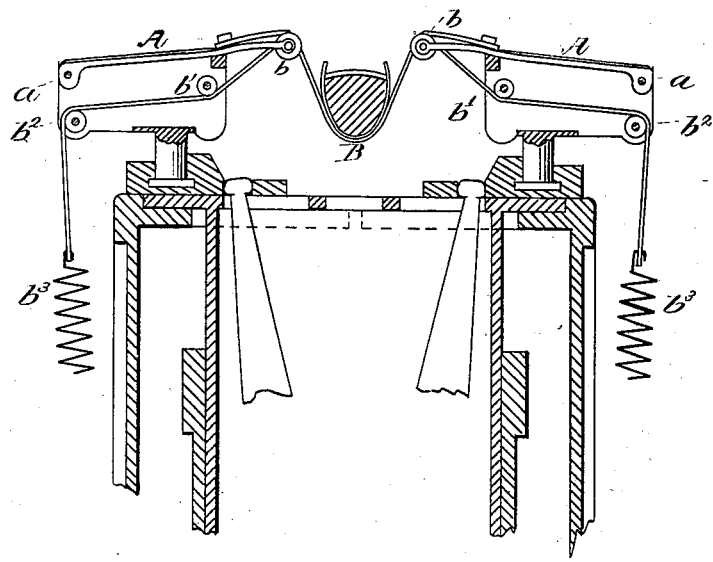
Figure 13:
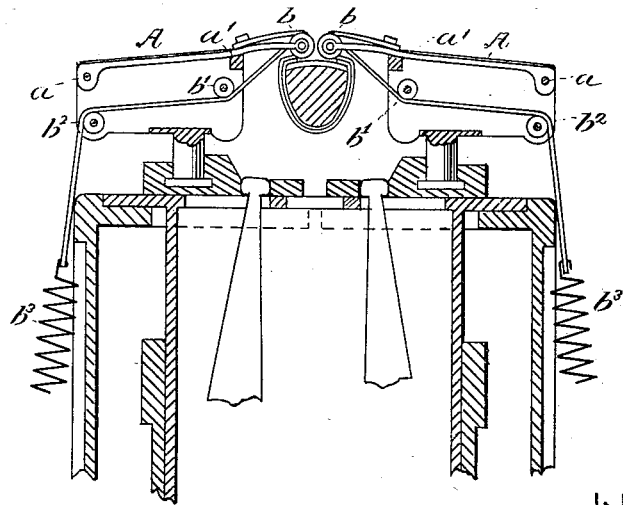

Figure 1 is a vertical cross-section of a Copeland lasting-machine containing our invention. Fig. 2 is a plan view thereof. Figs. 3 and 7 represent shank-lasting devices. Figs. 4 and 5 are detail views, hereinafter referred to. Figs. 6, 8, and 9 show our invention in a modified form. Fig. 10 represents the position of the last and upper in relation to the straps or bands before the commencement of the relative change in position of the last and jaws of the machine. Fig. 11 represents the same parts, the last and jaws having moved relatively in relation to each other sufficiently to bring the straps or bands in contact with the under surface of the last. Fig. 12 represents the same parts, the relative movement of the last and jaws having been continued until the straps or bands have been brought in contact with almost the entire surface of the vamp and under surface of the last. Fig. 13 represents the same parts as they appear on the completion of the lasting operation. Fig. 14 is a plan view, enlarged, of the strap-shield, hereinafter described.

The invention relates especially to a series of lasting straps or bands which are arranged to extend across the machine, beneath the last, from one set of side supports or fingers to the other, as represented in Fig. 1, or which extend upwardly from below the last to the supports or fingers, substantially as shown in Fig. 6, or as hereinafter described. These straps or bands are made of leather, rubber, or any other suitable material, and they are so attached to the jaws and supported by the side supports or side lasting fingers that in the operation of lasting the upper they have simply conforming and compressing action—that is, the last being jacked in the lasting-machine in any of the ordinary ways described in the various "Copeland" patents, so called, or in any other manner, the jaws carrying the supports or lasting-fingers and the straps or bands, rising upon a line substantially parallel with the sides of the last, bring the straps or bands to bear along the median line of the last from instep to toe, or upon sections immediately adjacent thereto, and from that line fit the upper to the last by a conforming or wrapping movement thereon, and without moving vertically upon the upper and last after being brought in contact therewith, the straps or bands being arranged to yield at their upper ends sufficiently to allow this movement to take place, and also to permit of their being used in folding the edge of the upper upon the surface of the insole by the horizontal, or substantially horizontal, movement of the fingers.

The jaws for supporting the supports or side lasting fingers and straps or bands and the mechanism for providing them with vertical and closing movements in relation to the last need not be described, as they are already fully explained in the various Letters Patent granted George W. Copeland and others, to which reference is made for further information concerning the details of construction.

The side lasting fingers A preferably are pivoted to the jaws at $a$, and are thereby permitted to have a vertical movement in relation to the jaws. The stops $a'$ limit the extent of the movement in a downward direction. These fingers carry or support the series of straps or bands B, which in Fig. 1 are represented as passing over the roll $b$, the construction of which is better shown in Figs. 4 and 5, under the guiding-rolls $b'$, over the guiding-rolls $b^2$, to the side springs, $b^3$, each band or strap being in one piece and extending from one spring across the machine, through or over the ends of oppositely-arranged fingers, to the spring upon the other side, and any number of these bands or straps may be used.

In Fig. 6, instead of extending the strap or band across the machine, we use two straps or bands, and extend each from its respective side spring over the end of its respective finger downwardly toward each other and over a suitable guide to the spring $b^4$. These straps or bands may cross each other under the last, instead of being arranged as represented in said figure.

For shank-lasting we prefer the construction shown in Figs. 3 and 7, consisting of the fingers C, oppositely arranged upon the jaws, and pivoted at $c$ to have a vertical movement against the stress of the springs $c'$, the stops $c^2$ limiting the extent of their downward vertical movement. To the end of each of these fingers is secured the strap or band $c^3$, which passes over a suitable guide to the spring $c^4$. These straps or bands will have of course a vertical movement in relation to the sides of the last as the jaws advance; but the construction used in Figs. 1 and 6, by which the straps or bands have only a conforming action, may be used.

In lieu of using the straps or bands with fingers in such a manner that they shall act additionally to fold the edge of the uppers upon the surface of the insole, we may attach them to independent side supports and use them for conforming the upper to the last as far as the edge of the insole and employ independent lasting plates or fingers for folding the edges of the upper upon the surface of the insole; and in lieu of moving the jaws vertically in relation to a stationary last for the purpose of causing the bands or straps to conform to the surface of the last, we may move the last vertically in relation to straps or bands which are held by supports, which are not moved, or which are stationary during this vertical movement of the last; and as these constructions adapted to use the vamp and shank lasting straps and their yielding supports are very fully described in various of the Copeland and Glidden patents, it is unnecessary for us to further describe them here.

The straps or bands may be attached to or held by the side lasting fingers or side supports in any desirable way, and we represent in Figs. 4 and 5 a roll of peculiar construction as among the ways.

It is quite necessary that the straps or bands should conform to the surface of the last and bear upon each with a uniform force throughout its width. In order that this may be accomplished, each strap or band should be supported in a manner to permit it to swing or move laterally on what may be termed its "vertical axis," and we provide it with this adjustment by means of the roll $b$, which has cone-shaped bearings $b'$ conversely arranged in relation to each other, as represented, and extending from the center of the roll outwardly. This construction allows the strap to automatically change its position to conform to the side of the last, as the roll has by this construction a lateral movement upon its pivot or shaft $d'$. There may also be used for the purpose of protecting the strap or band from the laster's hammer, or from the tacking or pegging devices, a metal shield, $d^2$, which may extend over the strap or band, as shown in Fig. 4, and which is fastened to the jaw by the bolt $d^3$, or in any other suitable way. While the straps or bands may be called a "girth" in the sense that the Copeland lasting device described in the Patent No. 201,914 is called a "girth," if a series of independently-acting straps or bands crossing or not crossing each other can be called a "girth," it varies in action materially from said girth or from the girth used in the Shailer and Etheridge machines of 1862 and 1863, and shown in their Patent 216,765, dated June 24, 1879, or from the rubber girth and leather aprons described in the Glidden Patent No. 251,430, in that their working-surfaces do not have a vertical movement upon the sides of the last, and therefore do not exert a wiping or dragging action upon the upper in fitting it to the last, as said girths do, but simply conform and hold the upper to the last by being brought in contact therewith gradually from or near the median line with something very like a rolling movement, in that the action advances from or near the median line to or over the edge of the insole, while the straps or bands themselves do not change their vertical position relatively to the sides of the last.

Of course there may be used with this lasting device pinchers, either hand or automatically operated, and for illustrations of the latter construction we refer to the various Glidden and McKay patents describing automatically-operated pinchers.

We prefer to make the straps or bands of leather; but they may be made of any other flexible material, and we may use in lieu of leather a chain or metal band, and a representation of a chain-strap is shown in Figs. 7, 8, and 9. The straps may be of any desired width.

In operation the jaws, lifting, bring the straps or bands in contact with the last at or near its median line, according to the form of construction used, and from that line or section, by the continued upward movement of the jaws, the straps or bands are made to conform to the surface of the last, the portion of the straps or bands between the fingers gradually increasing in length automatically by the yielding of the springs $b^3$ to enable this to be accomplished without dragging the straps upwardly on the vamp, and the upper is fitted thereto by pressure and held thereon while the closing-in movement of the jaws causes the straps or bands to fold the edge of the upper upon the surface of the insole, the straps or bands still rendering against the stress of the springs through the fingers. Upon the return of the jaws to their original position the retraction of the springs causes the straps or bands to be returned to their original place in relation to the fingers.

The principle of this invention is illustrated very well in Figs. 10, 11, 12, and 13. The first named, Fig. 10, shows the length, shape, and location of the straps or bands in relation to the last immediately prior to the lasting operation. Fig. 11 represents the lasting as having commenced, and shows that by the relative change in position of the last and the lasting-jaws or strap-supports the straps or bands have been drawn over the rolls $b$ to some extent, and the portions between the fingers increase in length sufficiently to accommodate themselves to their new position. Fig. 12 represents the straps or bands as having been drawn still more over the rolls $b$ to provide for the increased length between the fingers that is necessary on account of the further change in relative position of last and fingers or jaws. Fig. 13 shows the straps or bands closed upon the surface of the insole.

It will be noticed that whatever position the last occupies in relation to the fingers the bands or straps are always taut, because they act in opposition to the stress of the springs $b^3$.

We do not herein specially claim the metal or jointed strap described as a modification, and expressly reserve the right to make a specific claim therefor in a new application.

Having thus fully described our invention, we claim and desire to secure by Letters Patent of the United States—

1. In a machine for lasting the uppers of boots and shoes, a vamp-lasting device comprising one or more straps or bands, constructed and supported substantially as specified, and adapted to be brought in contact with the vamp at or near the median line of the last, and from that line or section to conform to the surface of the last and fit the vamp thereto and hold it thereon, all substantially as described.

2. In a lasting-machine, the combination of one or more vamp-lasting straps or bands, and supports for the same, and means, substantially as specified, for providing it or them with automatic yielding and take-up movements at their upper ends upon or over said supports, all substantially as and for the purpose described.

3. In a lasting-machine, the combination of side supports or fingers, having the movements in relation to the last, substantially as specified, and a series of vamp-lasting straps or bands carried or supported by said supports or fingers, and movable in relation thereto during the operation of lasting, whereby they automatically conform to the surface of the last from or near its median line to the insole without being drawn or advanced thereon during the relative change in position of the jaws and last, all substantially as and for the purposes described.

4. In a lasting-machine, the combination of a series of continuous straps or bands having elastic yielding end connections, a last, and means, substantially as specified, for causing the straps or bands to conform to the surface of the last without causing them to be dragged thereon, all substantially as and for the purposes described.

5. In a lasting-machine, a shank-lasting device consisting of the yielding fingers $c$, the straps $c^3$, and the springs $c^4$, all substantially as described.

6. The combination of the fingers A, rolls $b$, and straps or bands B.

7. The combination of the strap or band with the shield or guard $d^2$.

8. The combination of the straps or bands B, the fingers A, the guiding-rolls $b'$ $b^2$, and springs $b^3$, all substantially as described.

GEO. W. COPELAND.
MATTHIAS BROCK.

Witnesses:
F. F. RAYMOND, 2d,
BOWDOIN S. PARKER.